United States Patent

Hajek, Jr. et al.

Patent Number: 5,950,989
Date of Patent: Sep. 14, 1999

[54] VALVE INTERFACE HAVING MISMATCHED RADII

[75] Inventors: Thomas J. Hajek, Jr., Lockport; Srikrishnan T. Tolappa, Aurora, both of Ill.

[73] Assignee: Caterpillar Inc., Peoria, Ill.

[21] Appl. No.: 09/061,517

[22] Filed: Apr. 16, 1998

Related U.S. Application Data

[60] Provisional application No. 60/047,880, May 29, 1997.

[51] Int. Cl.$^6$ .................................................. F16K 25/00
[52] U.S. Cl. ............................................. 251/333; 251/359
[58] Field of Search .................................. 251/333, 366, 251/318, 321, 324, 325, 359

[56] References Cited

U.S. PATENT DOCUMENTS

| | | |
|---|---|---|
| 1,160,028 | 11/1915 | Wright . |
| 1,317,563 | 9/1919 | Eckenroth .......................... 251/333 X |
| 1,506,900 | 9/1924 | Greiner et al. . |
| 1,512,952 | 10/1924 | Secor . |
| 1,514,233 | 11/1924 | Searles et al. . |
| 2,665,675 | 1/1954 | Sheppard . |
| 4,215,715 | 8/1980 | Raskin ............................... 251/333 X |
| 4,475,494 | 10/1984 | Huther . |
| 4,543,925 | 10/1985 | Ruf . |
| 4,554,898 | 11/1985 | Yamada et al. . |
| 4,831,976 | 5/1989 | Pozniak et al. . |
| 5,267,723 | 12/1993 | Shea et al. . |
| 5,313,917 | 5/1994 | Santi . |

Primary Examiner—Kevin Lee
Attorney, Agent, or Firm—Calvin E. Glastetter

[57] ABSTRACT

A valve interface provides a zero leak function for an area control valve. The valve interface is established by sealing contact between a concave valve face and a convex valve seat having mismatched radii. The concave valve face is formed on a valve element slidably disposed in a bore of a housing and the convex valve seat is formed in the housing and intersects with the bore.

7 Claims, 1 Drawing Sheet

VALVE INTERFACE HAVING MISMATCHED RADII

This application is based on the material disclosed in U.S. provisional patent application Ser. No. 60/047,880 filed May 29, 1997.

TECHNICAL FIELD

This invention relates generally to a zero leak valve interface between a valve element and a valve seat and, more particularly, to a valve interface formed by an annular concave valve face on the valve element disposed for sealing contact with an annular convex valve face formed in a housing.

BACKGROUND ART

Some area control valves include a valve spool slidably disposed within a bore of a housing to define a zero leak valve interface between a conical valve face formed on the spool and an annular valve seat formed on the body. One of the problems experienced is that a hydrodynamic pressure field is sometimes formed by a convergent wedge of oil between the conical valve face and the valve seat, particularly where the conical intersects the cylindrical spool. This convergent wedge of oil prevents the conical valve face from fully closing against the arcuate valve seat, particularly when the closing force on the valve spool is small.

Thus, it would be desirable to provide a zero leak valve interface between the valve spool and the valve seat so that a divergent wedge of oil is formed to break up the hydrodynamic field to allow the valve face to fully close against the valve seat.

The present invention is directed to overcoming one or more of the problems as set forth above.

DISCLOSURE OF THE INVENTION

In one aspect of the present invention, a valve interface having mismatched radii includes a first bore formed in the housing, a smaller second bore opening into the first bore and an annular convex valve seat intersecting the second bore. A valve element slidably disposed in the second bore has an enlarged head portion extending into the first bore and defines an annular concave valve face positioned for sealing contact with the convex valve seat at an annular interface.

BEST MODE FOR CARRYING OUT THE INVENTION

Figure 1:
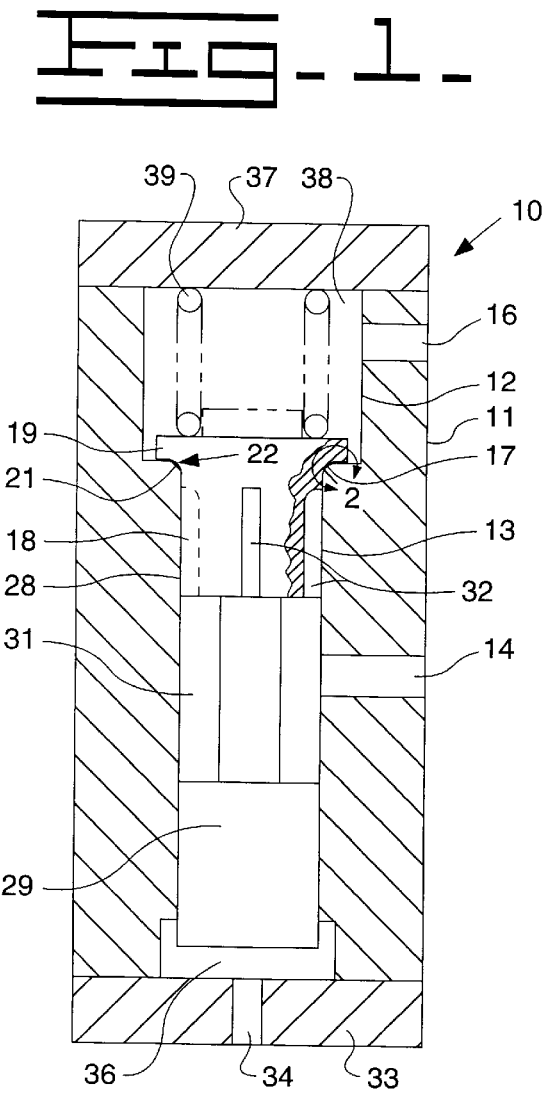
FIG. 1 is a cross sectional view of a diagrammatic representation of a area control valve embodying an embodiment of the present invention.

An area control valve 10 is illustrated in the drawings and includes a housing 11 having a bore 12, a smaller bore 13 opening into the bore 12, a port 14 opening into the bore 13, and a port 16 opening into the bore 12. An annular convex valve seat 17 is formed in the housing and intersects with the bore 13.

A valve element 18 in the form of an elongate spool slidably disposed in the bore 13 has an enlarged head portion 19 extending into the bore 12. The head portion 19 defines an annular concave valve face 21 positioned for sealing contact with the valve seat 17. In the illustrated closed position, the valve face 21 contacts the valve seat 17 generally at a valve interface 22.

Figure 2:
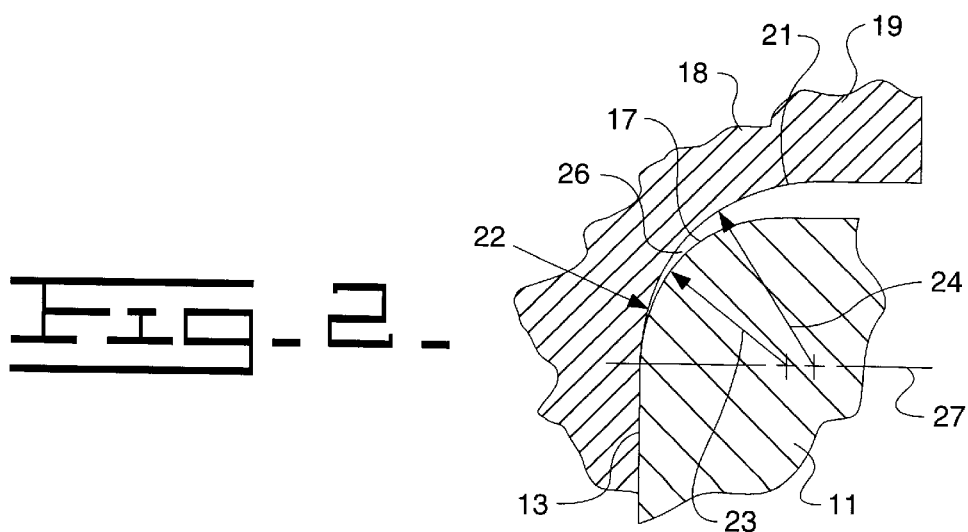
FIG. 2 is an enlarged view of a portion of the area control valve of FIG. 1 illustrating a valve interface of the present invention.

As more clearly shown in FIG. 2, the valve seat 17 has a radius indicated by the arrow 23 and the valve face 21 has another larger radius indicated by an arrow 24 so that an annular diverging wedge-shaped space 26 is formed adjacent the valve interface 22. The centers of the radii 23, 24 lie in a plane 27 which is perpendicular to the axis of the bore 13.

The valve element 18 includes a pair of lands 28, 29 axially disposed on opposite sides of an annular groove 31. The land 28 is adjacent the head portion 19 and includes a plurality of metering slots 32 which open into the annular groove 31 and terminate adjacent the valve face 21. A plate 33 is suitably connected to the lower end of the housing 11 and has a pilot port 34 opening into a pilot chamber 36. Similarly, another plate 37 is suitably secured to the opposite end of the housing 11 and defines a spring chamber 38. A spring 39 is disposed between the plate 37 and the head portion 19 for resiliently urging the valve face 21 into sealing engagement with the valve seat 17.

While the valve interface 22 is shown at the intersection of the head portion 19 and a land 28 of the valve element, alternatively the valve interface can be formed as the valve face of a poppet type valve.

INDUSTRIAL APPLICABILITY

In operation, the valve interface 22 between the valve face 21 and the valve seat 17 provides a zero leak function to prevent leakage between the ports 14 and 16 while the metering slots 32 provide an area opening control for controlling the rate of oil flow from the port 14 to the port 16. More specifically, initial upward movement of the valve element 18 unseats the valve face 21 from the valve seat 17 to establish an annular opening. Initially, there is no oil flow through the annular opening until the metering slots 32 reach a position to create a metering orifice between the metering slots and the bore 12. Once this position is reached, the rate of oil flow from the port 14 to the port 16 can be precisely controlled by controlling the area opening between the metering slots 32 and the bore 12.

In this embodiment, the upward movement of the valve element 18 is controlled by directing pressurized pilot fluid into the pilot chamber 36. The upward movement of the valve element 18 compresses the spring 39 which is subsequently used for moving the valve element 18 downward to block oil flow between the ports 14 and 16. As the valve face 21 moves downward toward the valve seat 17, the initial sealing contact between the valve face and the valve seat occurs such that a divergent wedge of oil formed by the mismatched radii breaks any hydrodynamic field that may occur so that fully sealing contact can be made between the valve face and the valve seat at flow closing forces.

Other aspects, objects and advantages of this invention can be obtained from a study of the drawings, the disclosure and the appended claims.

We claim:

1. A valve interface having mismatched radii comprising:
   a housing having a first bore, a smaller second bore opening into the first bore, and an annular convex valve seat intersecting the second bore; and a valve element slidably disposed within the second bore of the housing and having an enlarged head portion extending into the first bore, the head portion defining an annular concave valve face positioned for sealing contact with the convex valve seat at an annular interface.

2. The valve interface of claim 1 wherein the radius of the concave valve face is larger than the radius of the convex valve seat.

3. The valve interface of claim 2 including a spring resiliently biasing the valve element in a direction to cause the concave valve face to sealingly contact the convex valve seat.

4. The valve interface of claim 3 wherein the center of the radii lie in a plane perpendicular to a longitudinal axis of the second bore.

5. The valve interface of claim 4 wherein the valve element is a cylindrical spool having a first land adjacent the head portion, an annular groove adjacent the land, and a pair of metering slots formed in the land and opening into the annular groove for controlling fluid flow between the annular groove and the first bore.

6. The valve interface of claim 5 wherein the metering slots terminate adjacent the concave valve face.

7. A valve interface having mismatched radii comprising:

a housing having a first bore, a smaller second bore opening into the first bore, and an annular convex valve seat intersecting the second bore;

a valve element slidably disposed within the second bore of the housing and having an enlarged head portion extending into the first bore, the head portion defining an annular concave valve face positioned for sealing contact with the convex valve seat at an annular interface, the radius of the concave valve face positioned for sealing contact with the convex valve seat at an annular interface, the radius of the concave valve face is longer than the radius of the convex valve seat and the center of the radii lie in a plane perpendicular to a longitudinal axis of the second bore, the valve element is a cylindrical spool having a first land adjacent the head portion, an annular groove adjacent the land, and a pair of metering slots formed in the land and opening into the annular groove for controlling fluid flow between the annular groove and the first bore; and a spring resiliently biasing the valve element in a direction to cause the concave valve face to sealingly contact the convex valve seat.

\* \* \* \* \*